United States Patent Office 3,001,933
Patented Sept. 26, 1961

3,001,933
FLOCCULATION
Theodore P. Malinowski, Wilbraham, Mass., assignor to Monsanto Chemical Company, St. Louis, Mo., a corporation of Delaware
No Drawing. Filed Dec. 19, 1955, Ser. No. 553,703
2 Claims. (Cl. 210—54)

This invention relates to the flocculation of finely divided solid particles in aqueous dispersions thereof.

In many chemical processes, aqueous streams containing dispersed finely divided inert solid particles, often of a colloidal nature, are obtained. Such streams present a significant problem of water clarification and recovery. Streams of this type are commonly encountered in the wet dressing of ores, the processing of sugar cane and the handling of muds. It is an object of this invention to provide a process whereby the finely divided inert solid particles in such aqueous streams can be quickly and effectively flocculated thereby facilitating a rapid separation of the solid materials from the streams. Other objects will become apparent from a description of the invention.

It has now been discovered that finely divided solid inert particles dispersed in an aqueous medium can be quickly and effectively flocculated by adding thereto a minor amount of a cyanoethyl ether of starch. The following examples illustrate the invention:

FILTRATION TEST

The flocculating action of the cyanoethyl ethers of starch is illustrated by a filtration test. In this test 100 ml. of a 1% water suspension of kaolin is placed in a 100 ml. graduated cylinder. To this material is then added 2.0 ml. of 1% water solution of NaCl. The cylinder is then agitated end over end for 5 cycles. It is then allowed to stand for 5 minutes. The cyanoethyl starch ether is then added as a 0.1% water solution and the cylinder agitated for 5 cycles, allowed to stand for an additional 5 minutes and again agitated for 2 more cycles. The slurry is then placed in the filter cup of a Fann filter press and the time required to filter 75 ml. of filtrate at 5 p.s.i.g. using Whatman No. 50 filter paper recorded. The results of this test are shown in Table I. In this table D.S. indicates the degree of substitution of the cyanoethylated starch that is, the number of cyanotheyl ether groups per glucose unit in the starch tested. As an example, a D.S. of 0.25 means the cyanoethylated starch contains 0.25 cyanoethyl ether groups per glucose unit.

Table I
FILTRATION TEST (SEC.)

| Percent Cyanoethylated Starch on Clay | 0.0% | 0.025% | 0.05% | 0.07% | 0.1% |
|---|---|---|---|---|---|
| D.S. 0.25 | 510 | | 395 | | |
| D.S. 0.38 | 510 | | 400 | 395 | |
| D.S. 0.48 | 510 | 410 | | | 380 |
| D.S. 0.57 | 510 | 425 | 290 | 280 | 275 |
| D.S. 0.66 | 510 | 410 | | 385 | 365 |
| D.S. 0.73 | 510 | 375 | | 355 | 345 |

FLOC SETTLING TEST

A water suspension of kaolin is prepared by adding 2.5 g. of kaolin to 250 ml. of water in a Hamilton Beach mixer and then agitating the mixture for 1 minute. The slurry is transferred to a 250 ml. graduated cylinder and a 0.5 ml. of a 1% aluminum nitrate solution added. The mixture is agitated for 5 cycles and then allowed to stand for 5 minutes. The cyanoethylated starch to be tested is then added as a 0.1% water solution and the mixture is then agitated for 5 cycles. The settling time is then observed and recorded. The settling time is the time elapsed to end point where the level of the turbulent phase of the flocculated slurry reaches the settled layer of clay. Results are set forth in Table II.

Table II
FLOC SETTLING TEST (SEC.)

| Percent Cyanoethylated Starch on Clay | 0.0% | 0.04% | 0.1% |
|---|---|---|---|
| D.S. 0.25 | 470 | 414 | 372 |
| D.S. 0.38 | 470 | 443 | 438 |
| D.S. 0.48 | 470 | 362 | 375 |
| D.S. 0.57 | 470 | 107 | 113 |
| D.S. 0.66 | 470 | 275 | 224 |
| D.S. 0.73 | 470 | 230 | 204 |

The preceding filtration and floc settling tests clearly show the flocculating action of cyanoethylated starch. Cyanoethylated starch having any degree of substitution, even as high as 3.0, may be used for this purpose. Cyanoethylated starch containing from about 0.2 to about 1.0 cyanoethyl group per glucose unit is particularly preferred. As the degree of substitution increases water solubility decreases. In order to realize the full flocculating action of the higher substituted starches a water miscible solubilizer can be used. The lower ketones and lower alkyl alcohols are particularly useful in this regard.

The amount of cyanoethylated starch required to flocculate finely divided solid particles in aqueous dispersions thereof can be varied substantially. Only minor amounts of the cyanoethylated starches are required. As low as 0.01% by weight of cyanoethylated starch based upon the amount of finely divided solids present in the dispersion can be used in some applications. The use of cyanoethylated starch in amounts above about 0.1% by weight of clay offer no advantage in this application. In fact at concentrations much above 0.1%, the cyanoethylated starch begins to exhibit dispersing properties.

Cyanoethylated starch can be used to flocculate any finely divided inert solid material in aqueous dispersions thereof. Cyanoethylated starches are particularly useful for the flocculation of aqueous dispersions of clayey materials as shown in the preceding examples.

What is claimed is:
1. A process for flocculating finely divided solid particles in aqueous dispersions thereof which comprises adding to said dispersions a cyanoethylated starch containing from about 0.2 to about 1.0 cyanoethyl group per glucose unit in the amount of from about 0.01% to about 0.1% by weight of the finely divided solid particles.
2. A process for flocculating finely divided clay in aqueous dispersions thereof which comprises adding to said dispersions a cyanoethylated starch containing from about 0.2 to about 1.0 cyanoethyl group per glucose unit in the amount of from about 0.01% to about 0.1% of the clay.

References Cited in the file of this patent

UNITED STATES PATENTS

| 2,015,104 | Dreyfus | Sept. 24, 1935 |
| 2,316,128 | Bock et al. | Apr. 6, 1943 |
| 2,728,724 | Gloor | Dec. 27, 1955 |
| 2,728,725 | Gloor | Dec. 27, 1955 |

OTHER REFERENCES

Fair and Geyer: "Water Supply and Waste-Water Disposal," pub. by Wiley (N.Y.), 1954 (pages 620–1 relied upon).